Aug. 25, 1931.  H. CLAAR  1,820,528
LIME SPREADING ATTACHMENT FOR MANURE SPREADERS
Original Filed March 26, 1924
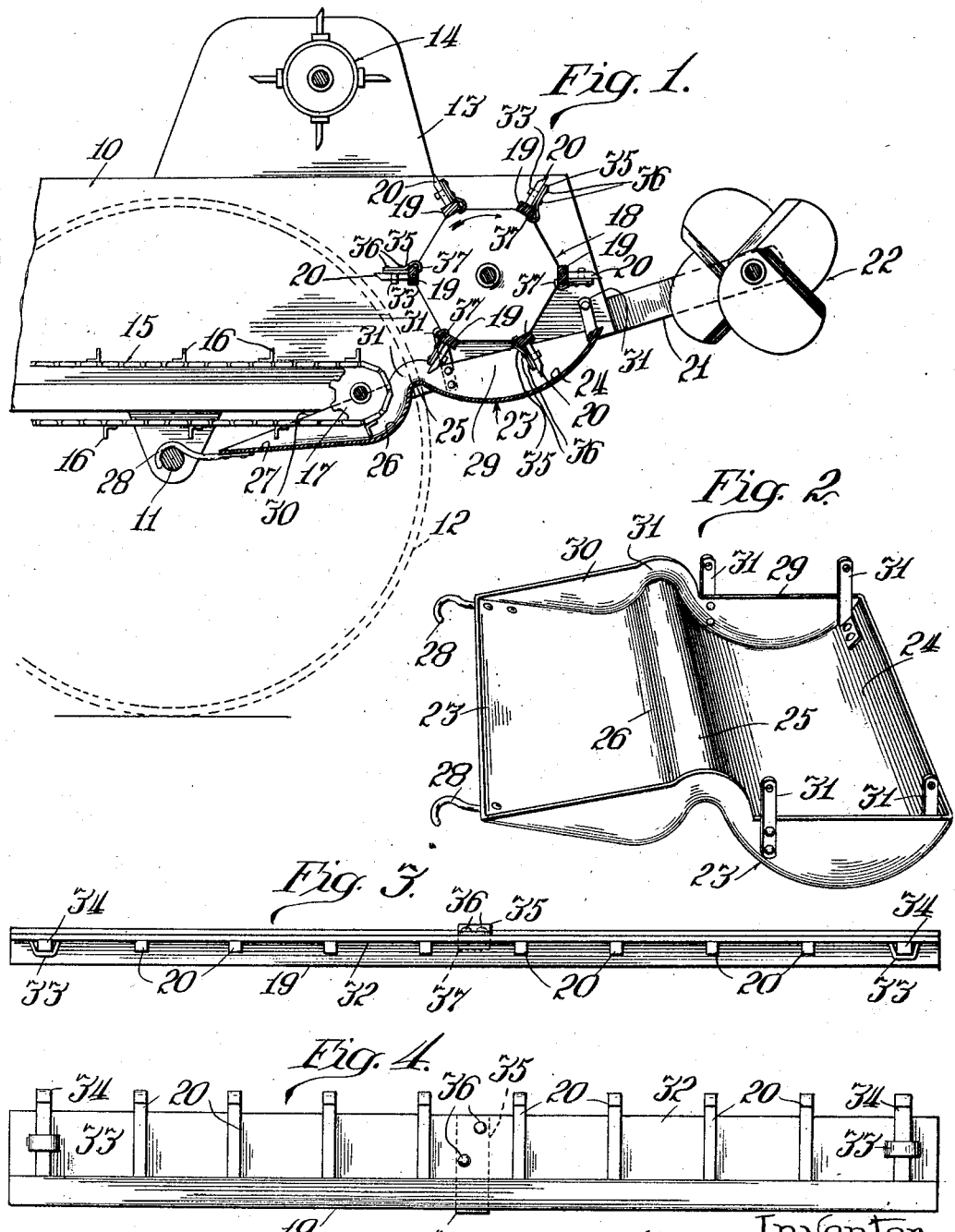

Patented Aug. 25, 1931

1,820,528

UNITED STATES PATENT OFFICE

HARRY CLAAR, OF WATSON, ILLINOIS, ASSIGNOR TO DEERE & COMPANY, OF MOLINE, ILLINOIS, A CORPORATION OF ILLINOIS

LIME SPREADING ATTACHMENT FOR MANURE SPREADERS

Original application filed March 26, 1924, Serial No. 701,949. Divided and this application filed April 11, 1928. Serial No. 269,052.

The present invention relates to manure spreading attachments, and has as its general object to provide an attachment which is adapted to convert the ordinary manure spreader into an efficient lime, sand or pulverized fertilizer spreader. This application is divisional of my application which matured into Letters Patent No. 1,669,693, on May 15, 1928, wherein I have shown such an attachment. The present application is directed more specifically to the detachable paddles which constitute a part of the aforesaid attachment. One of the particular objects of the present invention is to provide a paddle which can be mounted on the conventional beater of the ordinary manure spreader, and which can be quickly attached to and detached from said beater in converting the implement from a manure spreader to a lime spreader or vice versa.

Referring to the drawings:

Fig. 1 is a cross sectional view of a portion of a manure spreader showing the detachable paddles mounted on the beater;
Fig. 2 is a perspective view of the detachable pan or receptacle used in connection with my improved paddles;

Fig. 3 is a top plan view of one of the paddles, showing the manner in which it is removably secured to the teeth and bar of the beater; and Fig. 4 is a front elevational view of the paddle shown in Fig. 3.

In carrying out my invention, I have provided an improved form of attachment for an ordinary manure spreader which is adapted for use in connection with spreading materials that are in pulverized form. In connection with distributing and spreading materials that are in powdered or pulverized form, the ordinary manure spreader beater is so constructed that the beater teeth could not properly distribute the material; also the beater is positioned to the rear and adjacent the delivery end of the apron in such a manner that any pulverized material being distributed by the ordinary manure spreader drops down between the beater and the end of the apron and does not give the desired spread over a wide area that is required.

For the purpose of illustrating my invention, I have shown a manure spreader comprising a body 10 mounted on the usual supporting axle 11 and carrying wheels 12. Secured to the sides of the body 10 and extending upwardly therefrom are extension members 13 which form bearings for the usual rotating retarder 14. Operatively mounted in the bottom of the body or box 10 is the usual endless belt conveyor 15, which is provided with a plurality of lugs 16 for engaging and carrying the material in the body of the manure spreader rearwardly toward the delivery end thereof. The endless conveyor belt 15 is operatively driven by a driving roller 17, which is geared to the carrying or traction wheel 12 in a manner well known.

Rotatably mounted in bearings formed in the sides of the body 10 above and to the rear of the delivery end of the endless conveyor belt 15 is the usual beater 18. The beater 18 is provided with the usual cross-bars 19 which in turn are provided with radially projecting teeth 20. The beater 18, together with the radially projecting teeth 20, are positioned with respect to the delivery end of the endless conveyor belt 15 in such a manner as to form a relatively small space between the lugs 16 of the conveyor belt and the teeth 20 of the beater, to positively insure or prevent either of these members or parts from striking each other in their normal operation.

Positioned to the rear of the beater 18 and mounted on arms 21 secured to the body 10 of the manure spreader is the usual wide spread distributor 22. The wide spread distributor 22 is so positioned that as the material to be distributed is conveyed by the beater over the top thereof in the direction indicated by the arrow, it is delivered to the wide spread distributor, which in turn spreads the material over a wide area or swath. The wide spread distributor 22 and beater 18, as well as the rotating retarder 14, are operatively geared to the traction or carrying wheels 12 in the manner well known, and for this reason, it is thought unnecessary to specifically describe the manner in which all these parts are operatively driven.

Detachably secured to the sides of the body

10 is a detachable pan 23 which has its rearward portion curved concentrically as shown at 24 in a manner to conform with the curvature or path defined by the rotating teeth 20 of the beater 18. At a point between the beater 18 and the delivery end of the endless conveyor 15, the pan 23 deflects downwardly as shown at 25 and curves under the driving roller 17 of the endless conveyor 15 as shown at 26, and extends forwardly as shown at 27 to a point adjacent the axle 11. The extension 27 is provided on the opposite sides thereof with hooks 28 which are adapted to be detachably supported on the axle 11 for supporting the pan at its forward end beneath the lower path of the conveyor belt or apron.

The pan 23 is preferably made of a single piece of sheet metal and is provided with oppositely disposed sides 29 adjacent the curved portion 24 so as to form substantially a receptacle for receiving any loose material that may be dropped between the apron or conveyor belt and the beater. The sides 29 extend forwardly and taper downwardly as shown at 30 adjacent the extension 27. The rearward end of the pan 23 is supported in close proximity to the path defined by the teeth of the beater 18, by brackets 31 which in turn are adapted to be secured to the sides of the body.

From the above description, it will be readily seen that as the lime or other pulverized material being distributed is conveyed rearwardly by the endless conveyor or apron 15, the beater 18 will engage such material and convey it over the top thereof onto the wide distributor 22 mounted on the frame extension 21, and in the event any of the material should drop between the delivery end of the apron and the conveyor, it will fall into the receptacle 24 where it will be picked up as soon as a sufficient quantity is accumulated by the rotating beater and conveyed over the top of the beater without any loss.

The present invention is concerned with the provision of paddles of a certain improved construction which are capable of quickly attachable mounting on the beater teeth 20. These paddles consist of a series of longitudinally extending plates 32 having staple-like portions pressed outwardly on the outer ends thereof as shown at 33, which are adapted to receive the outer teeth 34 of each row of beater teeth 20. The plates 32 are positioned parallel to the teeth and are detachably secured in position by means of spring clips 35 which are secured to the plate 32 by means of rivets 36. The spring clips 35 are provided with right angularly disposed portions 37 which are adapted to engage the inner sides of the beater bars 19, as clearly shown in Figs. 1, 3 and 4.

It will thus be seen that by means of my improved attachment, the beater of an ordinary manure spreader may be readily converted into one adapted for spreading fine pulverized material, which, without my improved attachment, could not be used for such purpose, as the teeth of the beater of the ordinary spreader would merely pass through the fine material in the pan and not pick any of it up and carry it around to the wide spread beater in rear thereof. By my improved construction, each of the longitudinally extending series of teeth 20 with the plate attached thereto is converted into a blade, the beater 18 thus being converted into what may be termed a paddle wheel with a series of radially extending blades, which blades as the beater 18 rotates pick up a substantial amount of the fine material and carry it up and back to the wide spread beater 22, whereby a positive feed and a wide spread of the material is assured.

I claim:

1. In a lime spreading attachment for manure spreaders, the combination with a beater having a plurality of outwardly projecting teeth, of a plurality of plates extending longitudinally of said beater and detachably secured to said teeth.

2. In a lime spreading attachment for manure spreaders, the combination with a beater having a plurality of radially disposed teeth, of a plurality of plates on said beater, said plates having means cooperable with said teeth for positioning the plates longitudinally and radially with respect to said beater.

3. In a lime spreading attachment for manure spreaders, the combination with a beater having a plurality of radially disposed teeth, of a plurality of plates on said beater, said plates having means cooperable with said teeth for positioning the plates longitudinally with respect to said beater, and means carried by said plates and cooperable with said beater for detachably securing the plates in cooperable relationship with respect to said teeth.

4. In a lime spreading attachment for manure spreaders, the combination with a beater having a plurality of outwardly extending teeth, of a plurality of plates on said beater, said plates having means cooperable with said teeth for positioning the plates longitudinally and substantially radially with respect to said beater, and means cooperable with said beater for removably securing the plates thereto.

5. In a lime spreading attachment for manure spreaders, the combination with a beater having a plurality of bars extending longitudinally thereacross, and a plurality of radially disposed teeth mounted on said bars, of a plurality of plates on said bars, said plates having means cooperable with said teeth for positioning the plates longitudinally and radially with respect to said bars, and means cooperable with said bars for removably securing the plates thereto.

6. In a lime spreading attachment for manure spreaders, the combination with a beater having a plurality of longitudinally extending bars, and a plurality of radially disposed teeth secured to each of said bars, of radially disposed plates having staple-like portions formed therein and cooperable with said teeth for positioning said plates longitudinally of said bars, and spring clips secured to said plates and cooperable with the bars for removably securing the plates thereto.

7. In a lime spreading attachment for manure spreaders, the combination with a beater having a plurality of radially disposed teeth, of a plurality of plates having means cooperable with said teeth for positioning said plates radially and longitudinally with respect to said beater, and means cooperable with the beater for removably securing the plates thereto.

8. In a lime spreading attachment for manure spreaders, the combination with a beater having a plurality of radially disposed teeth, of a plurality of radially disposed plates having staple-like portions formed therein and cooperable with said teeth for positioning said plates longitudinally of said beater, and spring clips secured to said plates and cooperable with the beater for removably securing the plates thereto.

9. In a lime spreading attachment for manure spreaders, the combination with a beater having a plurality of outwardly projecting teeth, of a plurality of plates detachably secured to said beater and extending longitudinally thereof alongside of said teeth.

10. In a lime spreading attachment for manure spreaders, the combination with a beater having a plurality of outwardly projecting teeth, of a plurality of plates detachably secured to said beater and extending longitudinally thereof and resting against one side of the teeth.

11. In a lime spreading attachment for manure spreaders, the combination with a beater having a plurality of outwardly projecting teeth, of a plurality of plates carried by the beater longitudinally thereof and bearing against the working face of the teeth.

HARRY CLAAR.